United States Patent [19]

Khavand

[11] Patent Number: 5,231,682
[45] Date of Patent: Jul. 27, 1993

[54] METHOD OF MOUNTING AN OPTICAL FIBRE

[75] Inventor: Farzin M. H. Khavand, Plymouth, England

[73] Assignee: British Telecommunications public limited company, London, England

[21] Appl. No.: 651,233

[22] PCT Filed: Jun. 5, 1989

[86] PCT No.: PCT/GB89/00624

§ 371 Date: Feb. 8, 1991

§ 102(e) Date: Feb. 8, 1991

[87] PCT Pub. No.: WO89/11965

PCT Pub. Date: Dec. 14, 1989

[30] Foreign Application Priority Data

Jun. 9, 1988 [GB] United Kingdom ............... 8813668

[51] Int. Cl.$^5$ .......................... G02B 6/00; G02B 6/36
[52] U.S. Cl. ......................................... 385/42; 385/30
[58] Field of Search ............... 350/96.15, 96.20-96.22, 350/96.10, 96.11, 96.12; 385/15, 16, 27, 42, 51, 30

[56] References Cited

U.S. PATENT DOCUMENTS

| | | | |
|---|---|---|---|
| 4,444,458 | 4/1984 | Stowe et al. | 385/51 X |
| 4,444,460 | 4/1984 | Stowe | 385/51 X |
| 4,589,725 | 5/1986 | Dyott | 350/96.33 |
| 4,669,814 | 6/1987 | Dyott | 385/42 |
| 4,673,270 | 6/1987 | Gordon | 350/96.15 |
| 4,688,882 | 8/1987 | Failes | 385/51 X |
| 4,699,449 | 10/1987 | Lam et al. | 350/96.12 |
| 4,701,008 | 10/1987 | Richard et al. | 350/96.12 |
| 4,789,217 | 12/1988 | Mitch | 350/96.21 |
| 4,815,817 | 3/1989 | Levinson | 385/30 X |
| 4,896,930 | 1/1990 | Tsuchitani et al. | 350/96.12 |
| 4,997,253 | 3/1991 | Enochs | 350/96.10 X |

FOREIGN PATENT DOCUMENTS

| | | |
|---|---|---|
| 82/01533 | 5/1982 | European Pat. Off. . |
| 82/04328 | 12/1982 | European Pat. Off. . |
| 0149891 | 7/1985 | European Pat. Off. . |
| 0193966 | 10/1986 | European Pat. Off. ......... 350/96.12 |
| 0236712 | 1/1987 | European Pat. Off. . |
| 0230369 | 7/1987 | European Pat. Off. . |
| 0290253 | 9/1988 | European Pat. Off. . |
| 2506954 | 12/1982 | France . |
| 2577590 | 8/1986 | France . |
| 1574044 | 9/1980 | United Kingdom . |
| 2046466 | 11/1980 | United Kingdom . |
| 2186994 | 8/1987 | United Kingdom . |

OTHER PUBLICATIONS

*Patent Abstracts of Japan*, No. 58-95701 (Jun. 7, 1983) vol. 7, No. 196 (P-219)(1341), Aug. 26th, 1983.

*Primary Examiner*—Akm E. Ullah
*Attorney, Agent, or Firm*—Nixon & Vanderhye

[57] ABSTRACT

A D-fibre having a flat surface is mounted by pressing the fibre into a heated thermoplastic substrate by a former surface until the flat surface is flush with any adjacent surface of the substrate. The former surface may be non-planar to form an undulating flat surface of the fibre, for example. The method finds particular application in the production of half-coupler blocks as well as making components of other coupler and optical switches.

19 Claims, 2 Drawing Sheets

METHOD OF MOUNTING AN OPTICAL FIBRE

FIELD OF THE INVENTION

This invention relates to a method of mounting an optical fibre of particular, but not exclusive, application to mounting D-fibres. D-fibres are optical fibres having a D-shaped cross-section with the core of the fibre near the linear portion of the cross-section.

BACKGROUND OF THE INVENTION

Fibres have been used as optical couplers by removing part of the cladding surrounding the fibre core of a pair of fibres and placing them in contact. The reduced cladding allows coupling between the cores due to their close proximity. One method of forming such a coupler is to make half-coupler blocks by embedding a gently curved fibre in a glass substrate and polishing it to remove a portion of the cladding. A pair of these half-coupler blocks can then be placed together to form an optical coupler. The surfaces of the substrates being flush with the exposed fibre surfaces hold the fibres in the desired position. The manufacturing process is, however, time consuming and needs to be carried out with great care to ensure the correct amount of fibre cladding is removed.

SUMMARY OF THE INVENTION

It is an object of the present invention to provide a method of mounting an optical fibre which largely overcomes these disadvantages.

Accordingly, there is provided a method of mounting an optical fibre having a flat surface which includes the step of pressing the fibre into a heated thermoplastic substrate with a former surface until the flat surface of the fibre is flush with any adjacent surface of the substrate.

By flat surface is meant the surface defined by the linear portion of the cross-sections of an optical fibre, as found for example with rectangular or D-shaped optical fibres, notwithstanding that the surface may be curved or twisted before, during or after mounting. The surface shape of the former will determine the final disposition of the flat surface whether it be curved, rippled or in a single plane.

The invention is based on the fact first appreciated by the applicant that the resultant surface formed by the substrate and flat surface of the optical fibre can be made flat to about 0.4 microns which compares favourably with polished silica half couple blocks described above.

The thermoplastic material is preferably a co-polymer of poly (2,6-dimethyl-p-phenylene oxide) and polystyrene, but may be of polypropylene or polymethylmethacrylate polystyrene or other suitable thermoplastic material.

The invention also finds application in mounting an optical fibre for use in a wavelength selective optical coupler where it is required to hold a D-fibre, for example, with the flat surface fixed in an undulatory form as described in the applicant's application GB8813667 titled "A Wavelength Selective Optical Coupler" filed on the 9th Jun. 1988. This is achieved by preparing the former surface with the required undulations which are then impressed on the fibre as it is passed into the substrate.

According to a further aspect of the present invention there is provided an optical device which comprises an optical fibre having a flat surface embedded in a thermoplastic substrate with the flat surface flush with any adjacent surface of the substrate.

BRIEF DESCRIPTION OF THE DRAWINGS

This method of mounting an optical fibre and various applications of the method will now be described with reference to the accompanying drawings in which.

DETAILED DESCRIPTION OF THE DRAWINGS

Figure 1:
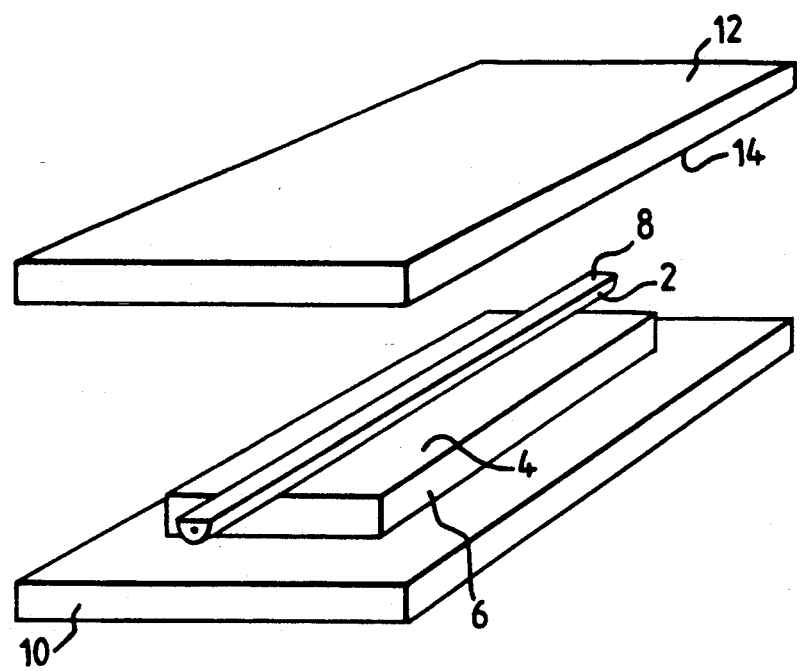
FIG. 1 is a perspective view illustrating a method of mounting an optical fibre according to the present invention.

Referring to FIG. 1, a D-fibre 2 is shown placed on the upper surface 4 of a thermoplastic substrate 6 with its flat surface 8 uppermost. The thermoplastic is the co-polymer of poly-(2,6-dimethyl-p-phenylene oxide) and polystyrene marketed by the General Electric Corporation under the trade name "Noryl" although other thermoplastics may be used. The substrate 6 is supported by a rigid support 10. The substrate is heated by a heater (not shown) until it is deformable by the fibre 2 when pressed by a former 12 having an optically flat, planar under-surface (former surface) 14, for example a glass microscope slide. The former 12 is pressed against the fibre with a pressure of 2 to 20 psi while the substrate is maintained at 120° C. is forced into the substrate until the flat surface 8 is flush with the top surface of the substrate. The former 12 is then removed and the substrate allowed to cool to room temperature over a period of about an hour.

Figure 2:
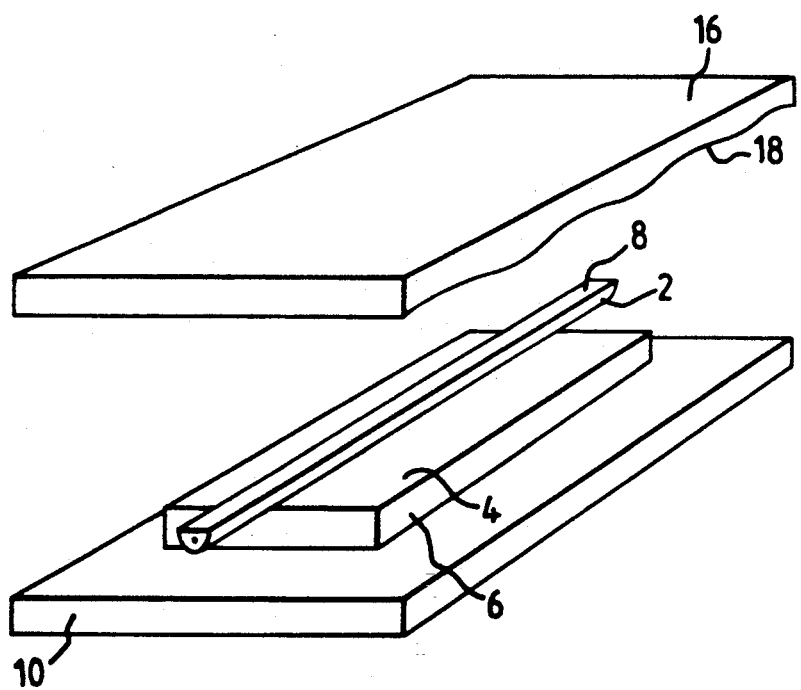
FIG. 2 is a perspective view of a D-fibre being pressed to be held in an undulating formation.
Figure 3:
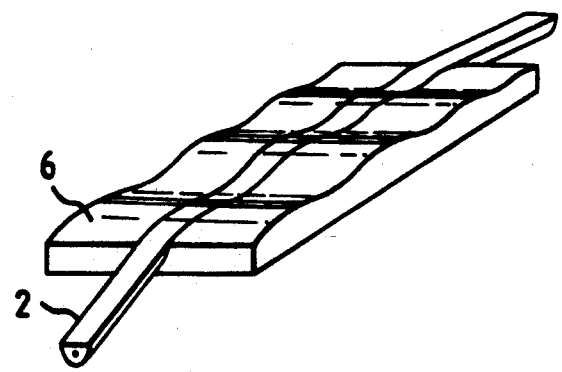
FIG. 3 is a perspective view of an undulating optical fibre produce by the method illustrated by FIG. 2.

Referring now to FIG. 2 there is shown a similar arrangement to that of FIG. 1 except that a former 16 is used which has an undulatory former surface 18 which when pressed against the fibre 2 as in the method described above forms an undulating optical fibre as shown in FIG. 3. This may then be placed in contact with a D-fibre held in a substrate as produced using the planar former 12 of FIG. 1 to thus form a wavelength selective optical coupler as described in the applicant's patent application referred to earlier.

An alternative method of using the former with a non-planar forming surface is to first press the former against the heated substrate to shape the top surface of the substrate in conformity with the former surface, remove the former, place the fibre on the substrate and then press the fibre into the substrate using the same former. This reduces the strain on the optical fibre during pressing.

The former may be pressed against the fibre with a desired pressure before the substrate has started to be heated or before it has been heated sufficiently to allow the fibre to be pressed into it. In this case the substrate is heated or heated further after the pressure is applied until it is plastic enough to deform.

Figure 4:
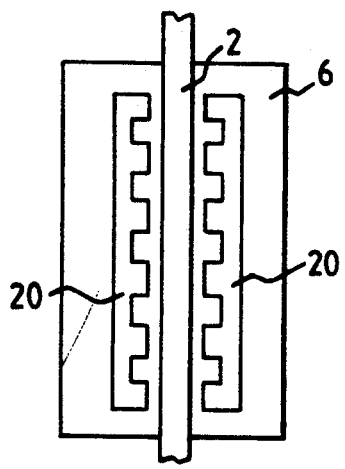
FIG. 4 is a plan view of a D-fibre mounted in a substrate by the method of the present invention in which electrodes have been embedded in the substrate at the same time as the fibre.

Referring now to FIG. 4 there is shown a substrate 6 and D-fibre 2 in which electrodes 20 have been pressed into the substrate by the former. This can be done simultaneously or as a separate step. Such an arrangement, and similar arrangements, find application for example in electrostatically operated fibre switches where an adjacent fibre is attracted to the electrodes structure to come into coupling contact with the embedded fibre.

Figure 5:
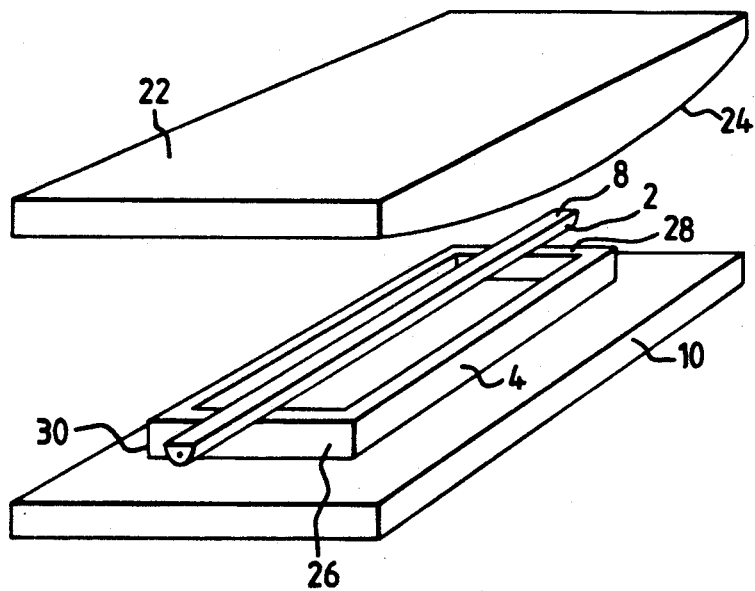
FIG. 5 is a perspective view illustrating a method of mounting of D-fibre in a non-continuous mount so as to allow the D-fibre to be deflectable.
Figure 6:
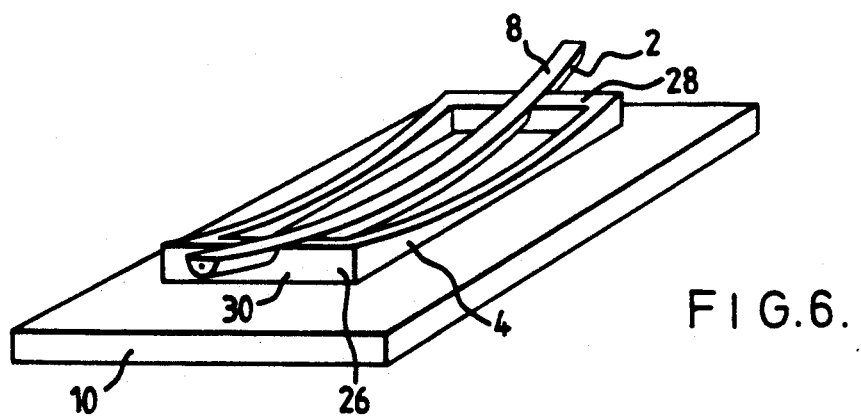
FIG. 6 is a perspective view of a deflected D-fibre in a non-continuous mount as produced by the method illustrated in FIG. 5.

Referring to FIG. 5 a former 22 having an convex former surface 24 is shown about to be pressed against a D-fibre 2 supported at spaced apart portions 26 and 28 of a substrate 30 having a hollow centre. The former 22 presses the D-fibre 2 into the end portions while forcing the fibre 2 onto the hollow. This method produces a device as shown in FIG. 6 in which the fibre can move up and down, for example in response to an electrostatic field produced by the electrodes 20 of an adjacently placed device of FIG. 4 thereby forming an electrostatic optical switch. The substrate 6 of FIG. 4 may contain added high dielectric materials for example $T_iO_2$ to enhance the electrostatic effect.

It will be appreciated that other shapes of former and substrate can be employed with the method of the present invention to provide various configurations of supported optical fibre and that other forms of optical fibre having a flat surface extending along the fibre's length other than D-fibres may be used.

The present invention provides a simple, method of forming a robust mount in which the flat surface of the optical fibre is flush with the surface of the supporting substrate to sub-micron accuracy more quickly and cheaply than previously possible. For example, a half coupler block can be made according to the present invention in less than 10 minutes, once a former has been prepared, at a cost considerably less than required for a polished half coupler block.

The former is preferably of glass but other materials may be employed if they can be given the required surface finish.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A method of mounting an optical fibre having a flat surface which includes the step of pressing the fibre into a heated thermoplastic substrate with a former surface until the flat surface of the fibre is flush with an adjacent surface of the substrate.

2. A method according to claim 1 in which the optical fibre is a D-fibre.

3. A method according to claim 1 in which the former surface is planar.

4. A method according to claim 1 in which the former surface is undulatory.

5. A method according to claim 4 in which the former surface is pressed against the heated thermoplastic substrate before pressing the fibre into it.

6. A method according to claim 1 in which a non-fibre component is also pressed by the former surface into the heated thermoplastic substrate.

7. A method as claimed on claim 1 in which the former surface is a glass surface.

8. A method of using an optical fibre mounted in a thermoplastic substrate in accordance with the method of claim 1 comprising:
   placing the said adjacent surface of two said mounted optical fibres in contact with each other to form an optical coupler.

9. A method of mounting an optical fibre having a flat surface which includes the step of pressing the fibre into a heated thermoplastic substrate with a former surface until the flat surface of the fibre is flush with an adjacent surface of the substrate, in which the substrate is a copolymer of poly(2,6-dimethyl-p-phenylene oxide) and polystyrene.

10. An optical device comprising an optical fibre having a flat surface embedded in a thermoplastic substrate with the flat surface flush with an adjacent surface of the substrate.

11. A device as claimed in claim 10 in which the flat surface of the optical fibre is undulating.

12. A device as claimed in claim 10 in which the fibre has an unsupported portion between two portions supported by the substrate.

13. A device as claimed in claim 12 in which the unsupported portion of the optical fibre is free to move relative to the substrate.

14. A device as claimed in claim 10 in which the optical fibre is a D-fibre.

15. An optical device as in claim 10 further including a non-fibre component embedded in said thermoplastic substrate.

16. An optical device as in claim 15 wherein the non-fibre component includes electrodes for applying electrical fields to said optical fibre.

17. An optical device comprising an optical fibre having a flat surface embedded in a thermoplastic substrate with the flat surface flush with an adjacent surface of the substrate, in which the substrate is a copolymer of poly(2,6-dimethyl-p-phenylene oxide) and polystyrene.

18. An optical device comprising an optical fibre having a flat surface embedded in a thermoplastic substrate, the flat surface of the optical fibre being flush with an adjacent moulded unpolished surface of the substrate.

19. An optical device as claimed in claim 18 in which the resultant surface formed by the substrate and flat surface of the optical fibre is flat to less than 0.4 micron.

* * * * *